May 15, 1962  F. B. SLEZAK ETAL  3,035,055
PREPARATION OF 2,4-DIOXOHEXAHYDRO-1,3,5-TRIAZINE
Filed Feb. 8, 1960
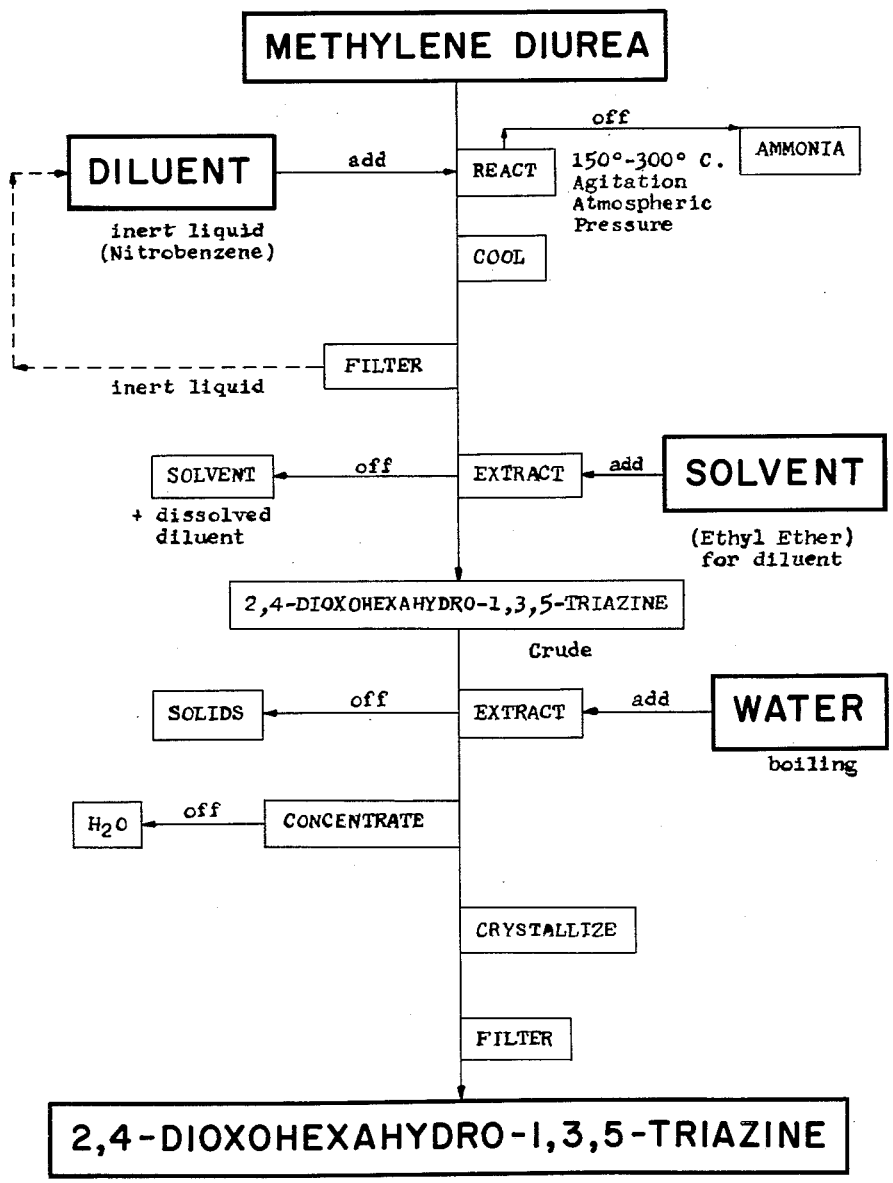
INVENTORS
FRANK B. SLEZAK
HENRY A. McELRAVY, JR.
BY Warburton & Cross
ATTORNEYS United States Patent Office 3,035,055
Patented May 15, 1962

3,035,055
PREPARATION OF 2,4-DIOXOHEXAHYDRO-1,3,5-TRIAZINE
Frank B. Slezak and Henry A. McElravy, Jr., Painesville, Ohio, assignors to Diamond Alkali Company, Cleveland, Ohio, a corporation of Delaware
Filed Feb. 8, 1960, Ser. No. 7,312
7 Claims. (Cl. 260—248)

This invention relates to a new and improved method of preparing 2,4-dioxohexahydro-1,3,5-triazine.

2,4-dioxohexahydro-1,3,5-triazine is a known compound which is reported, for example, in Chemical Abstracts, vol. 35, page 5259 (1941). This compound has the following structure:

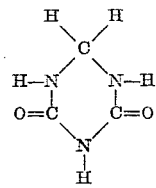

Prior methods for preparing this compound have not been entirely satisfactory insofar as matters of ease of reaction, product yields and desired purity are concerned. For example, in the method reported in the foregoing Chemical Abstracts reference, 2,4-dioxohexahydro-1,3,5-triazine is reported as being prepared by heating methylene diurea in a vacuum. While the yield is not there reported, repetition of this process led to procedural difficulties and an apparent yield which is undesirably low. In addition, difficulties are encountered because of charring and high viscosity of the reaction mass.

Accordingly, it is a principal object of this invention to provide a new and improved method for preparing 2,4-dioxohexahydro-1,3,5-triazine wherein the foregoing difficulties are avoided.

The present invention comprises a process of preparing 2,4-dioxohexahydro-1,3,5-triazine by cyclizing methylene diurea in an inert liquid diluent and more particularly, as shown in the accompanying drawing via schematic flow sheet, by heating methylene diurea in an inert liquid diluent at substantially atmospheric pressure to an elevated temperature within the range from about 150° C., since at lower temperatures significantly poorer yields are obtained, to about 300° C., the preferred temperature range being about 200° C. to 230° C., with optimum results obtained at a temperature approximating the melting point of the methylene diurea.

The term "inert liquid diluent" as used in the specification and claims is intended to refer to various normally liquid, non-aqueous organic compounds which are non-reactive with the methylene diurea and the formed 2,4-dioxohexahydro-1,3,5-triazine and which have a boiling point at atmospheric pressure within the range from about 150° C. to 300° C., preferably about 180° to 265° C. Illustrative of suitable inert liquid diluents are aromatic mononitro compounds such as mononitrobenzene (B.P. 210.9° C.) which is preferred at present, as well as compounds such as orthonitrotoluene (B.P. 222.3° C.), meta-nitrotoluene (B.P. 230–1° C.), and paranitrotoluene (B.P. 237.7° C.); pseudocumene; methyl naphthalene; as well as certain ethers such as di-n-hexyl ether, diphenyl ether, dibutyl ether of diethylene glycol, other ethers of ethylene glycol, diethylene glycol and triethylene glycol, e.g., monoglyme (dimethyl ether of ethylene glycol), diglyme (dimethyl ether of diethylene glycol) or triglyme (dimethyl ether of triethylene glycol); or esters such as n-butyl benzoate or n-octyl acetate; or aromatic aliphatic mixed ethers such as anisole, or the like.

Reaction is advantageously carried out at the reflux temperature of the reaction mixture as dictated, of course, by the inert diluent employed. Atmospheric pressure generally is utilized except in those instances where a slight vacuum may be desired to facilitate removal of the formed ammonia, no vacuum being essential, however. If desired, the reaction chamber can be purged or swept with air or an inert gas, such as nitrogen or carbon dioxide to facilitate removal of the formed ammonia.

The time of reaction can be varied but generally the reaction should be carried out with agitation until substantially all of the ammonia theoretically capable of being formed during the reaction is liberated. In practice, using an inert liquid diluent of the foregoing type at atmospheric pressure, or slight subatmospheric pressure, reaction is generally complete, that is, evolution of ammonia ceases, in about three to five hours or less. In many instances, the methylene diurea initially is suspended and/or dissolved in the hot inert liquid diluent and reflux continues, while the crude product precipitates out, until the ammonia evolution ceases.

The thus-obtained reaction mixture, which constitutes solid 2,4-dioxohexahydro-1,3,5-triazine dispersed in the inert diluent which may still contain some unreacted molten methylene diurea, provided the temperature still is greater than the melting point of the methylene diurea, is cooled and the inert diluent removed by filtration, centrifuging, or the like and recycled if desired. The resulting solid is extracted with a low boiling organic solvent inert with respect to the 2,4-dioxohexahydro-1,3,5-triazine and capable of selectively dissolving the inert diluent from the product.

The term "organic solvent" as used in the specification and claims is intended to refer to inert selective solvents having a boiling temperature substantially different from the boiling temperature of the inert diluent. In general, any low boiling organic liquid inert with respect to the reactant and product and incapable of dissolving the product but capable selectively of dissolving the inert diluent can be used, preferably those solvents having a boiling temperature no greater than about 100° C., preferably under 50° C., or with an extremely low heat of vaporization. Illustrative solvents are ethyl ether; isopropyl ether; benzene; esters such as ethyl acetate and methyl acetate; low boiling petroleum ether cuts; aliphatic hydrocarbons, such as n-hexane, n-heptane, cyclohexane and unleaded gasoline; or chlorinated hydrocarbon solvents such as carbon tetrachloride, chloroform, methylene dichloride, tetrachloroethylene, trichloroethylene, ethylene dichloride, or the like.

The solvent is then separated from the solid product which is extracted with water, generally boiling water, to remove water-soluble components of the product mixture. More specifically, the water serves to separate any water insoluble impurities, such as urea formaldehyde polymer from the methylene diurea, substantially pure 2,4-dioxohexahydro-1,3,5-triazine being dissolved in the water. The aqueous solution of 2,4 - dioxohexahydrol - 1,3,5 - triazine then advantageously is concentrated, although concentration is not essential except as to reduce the volume of liquid to be handled, and cooled to precipitate 2,4-dioxohexahydro-1,3,5-triazine in substantially pure form. Recrystallization of the separated product can be effected from any suitable solvent, water being the most convenient and preferred solvent.

The proportions of inert liquid diluent and methylene diurea can be varied widely provided that at least sufficient inert liquid diluent is employed to facilitate agitation and prevent charring or localized overheating during the cyclization reaction. In general, advantageous results are obtained when the quantity of inert diluent is about at least about 1 to 5 times the quantity of the methylene diurea employed.

In carrying out the process of this invention, methylene diurea can be used in a purified form if desired but in most instances little advantage is obtained in using the purified material. Contrariwise, it has been discovered that relatively crude methylene diurea can be used advantageously in the practice of this invention, e.g., methylene diurea as obtained by reacting aqueous formaldehyde and urea and drying the formed product without purification thereof.

The compound produced by the practice of this invention is useful as an intermediate for chlorinated 2,4-dioxohexahydro-1,3,5-triazine which in turn is a useful bactericide.

In order that those skilled in the art may more completely understand the present invention and the preferred methods by which the same may be carried into effect, the following specific examples may be offered.

EXAMPLE 1

Part A

Into a 4-liter beaker equipped with a mechanical stirrer is charged 1500 ml. of water, 1200 g. (20 mols) of urea, 250 ml. (3.32 mols) of 40% aqueous formaldehyde solution and 25 ml. of concentrated hydrochloric acid. The resulting mixture is stirred for 24 hours, and the thus formed solid separated by filtration and suction dried and heated at 110° C. to complete the drying. There is obtained by this method 380 g. to 420 g. of methylene diurea (88% to 98% yield) melting at 210° C. to 220° C.

Part B

Using the methylene diurea prepared by the procedure of Part A, into a 1-liter, 3-necked flask equipped with a mechanical stirrer and an air condenser is introduced 132 g. (1 mol) of dry methylene diurea and 500 ml. of nitrobenzene. The stirred mixture of crude, dry, methylene diurea and nitrobenzene is heated at a gentle reflux at atmospheric pressure for 5 hours. After cooling and filtering, the tan solid residue is triturated with two 200 ml. portions of ethyl ether. The remaining solid is then extracted with three 1-liter portions of boiling water, the combined aqueous extracts being decolorized with carbon, concentrated to a volume of 200–300 ml. and cooled. After filtration and drying, a 52% yield of 2,4-dioxohexahydro-1,3,5-triazine decomposing at 300° C. is obtained. Analysis of the product so obtained indicates formation of the desired compound $C_3H_5N_3O_2$ and is as follows:

| Element | Percent by Wgt. Calculated | Percent by Wgt. Actual |
| --- | --- | --- |
| Carbon | 31.3 | 31.4 |
| Hydrogen | 4.4 | 4.3 |
| Nitrogen | 36.5 | 35.4 |

EXAMPLE 2

A stirred mixture of crude, dry methylene diurea, melting at 212–214° C., (132 g., 1 mol) and 500 ml. of nitrobenzene is heated at reflux for 4.5 hours. After cooling and filtering, the residue is washed twice with 200 ml. portions of ethyl ether. The crude yield is 89% of theory. The solid is extracted with three one-liter portions of boiling water, the combined extracts decolorized with carbon, concentrated until crystals begin to form and cooled. Filtration and drying give 80 g. (69.5%) of 2,4-dioxohexahydro-1,3,5-triazine decomposing above 300° C.

EXAMPLE 3

A stirred mixture of crude dry methylene diurea, melting at 185–189° C., (132 g., 1 mol) and 500 ml. of nitrobenzene is heated at reflux for 4.5 hours. After cooling and filtering, the residue is washed twice with 200 ml. portions of ethyl ether. The crude yield is 93% of theory. The crude solid is recrystallized from water as described above to give 88 g. (76%) pure 2,4-dioxohexahydro-1,3,5-triazine.

EXAMPLE 4

A stirred mixture of methylene diurea (66 g., 0.5 mol) is refluxed in 250 ml. of n-hexyl ether until ammonia evolution ceases (10 hours). Filtration and drying give 48 g. (83.5%) of crude 2,4-dioxohexahydro-1,3,5-triazine melting above 300° C.

EXAMPLE 5

Part A

To illustrate the difficulties encountered when no inert liquid diluent is employed, the procedure reported at C.A. 35, 5259 (1941) is repeated by heating 52 g. (0.39 mol) of methylene diurea in a stream of air under reduced pressure at a temperature of 130° C.–140° C. Considerable fuming occurs and liquifaction of the compound is incomplete. No product is separated.

Part B

To the material of Part A 50 ml. of nitrobenzene is added and refluxed for 2 hours. On cooling, a solid mass is obtained which is recrystallized from water to give but a 27% yield (12 g.) of product melting at 285° C.

Using the procedure of the foregoing examples with 500 ml. of nitrobenzene employed as the inert liquid diluent for 132 g. of ethylene diurea, the following results are obtained after 4.5 hours of reflux at atmospheric pressure.

| Example No. | M.P. of methylene diurea (° C.) | Crude Yield (Percent) | Pure Yield [1] (Percent) |
| --- | --- | --- | --- |
| 6 | 215–218 | 90 | 72 |
| 7 | 212–214 | 91 | 67 |
| 8 | 185–189 | 91 | 71 |
| 9 [2] |  | 92 | 70 |

[1] 2,4-dioxohexahydro-1,3,5-triazine decomposing above 300° C.
[2] 100 g. of methylene diurea and 400 ml. of nitrobenzene used as inert liquid diluent and refluxing continued 7.75 hours.

It is to be understood that although the invention has been described with specific reference to particular embodiments thereof, it is not to be so limited, since changes and alterations therein may be made which are within the full intended scope of this invention as defined by the appended claims.

What is claimed is:

1. The method of preparing 2,4-dioxohexahydro-1,3,5-triazine which comprises heating together with agitation at substantially atmospheric pressure a mixture of 1 part of methylene diurea and 1 to 5 parts of mononitrobenzene at a temperature of about 200° C. to 230° C. until evolution of ammonia ceases, cooling the resulting mixture to room temperature, separating the solid product, treating said product with a solvent for nitrobenzene, separating a solid crude product therefrom, extracting 2,4-dioxohexahydro-1,3,5-triazine from said solid with boiling water, concentrating the aqueous extract and precipitating the desired 2,4-dioxohexahydro-1,3,5-triazine therefrom.

2. The method as in claim 1 wherein the solvent is ethyl ether.

3. In the method of preparing 2,4-dioxohexahydro-1,3,5-triazine by cyclizing methylene diurea, the improvement which comprises heating at atmospheric pressure methylene diurea with an inert liquid diluent having a boiling point in the range of about 130°–300° C. to the reflux temperature of the diluent until evolution of ammonia substantially ceases.

4. The method of claim 3 wherein the inert liquid diluent is nitrobenzene.

5. The method of claim 3 wherein the inert liquid diluent is n-hexyl ether.

6. The method of claim 3 wherein crude methylene diurea is employed.

7. The method of claim 3 wherein the methylene diurea and inert liquid diluent are employed in a weight ratio of about 1:1 to 1:5.

References Cited in the file of this patent
FOREIGN PATENTS

| | | |
|---|---|---|
| 479,349 | Germany | July 20, 1929 |
| 694,823 | Germany | Aug. 9, 1940 |

OTHER REFERENCES

Schiff: Annalen der Chemie, vol. 291, pp. 367 to 371 (1896).

MacArdle: The Use of Solvents in Synthetic Organic Chemistry, pp. 1 to 3, D. Van Nostrand Co., 1925.

Diels et al.: Ber. D. Deutsch, Chem. Ges., vol. 59, pp. 2778, 2781 (1956).